C. WEBKE.
CANDY PRESSING MACHINE.
APPLICATION FILED OCT. 12, 1920.
1,392,863.
Patented Oct. 4, 1921.
2 SHEETS—SHEET 1.
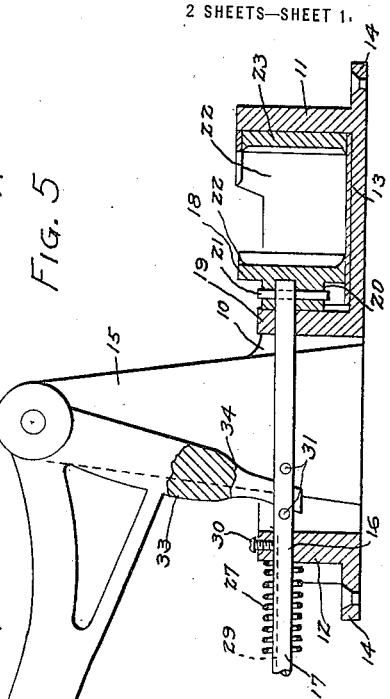
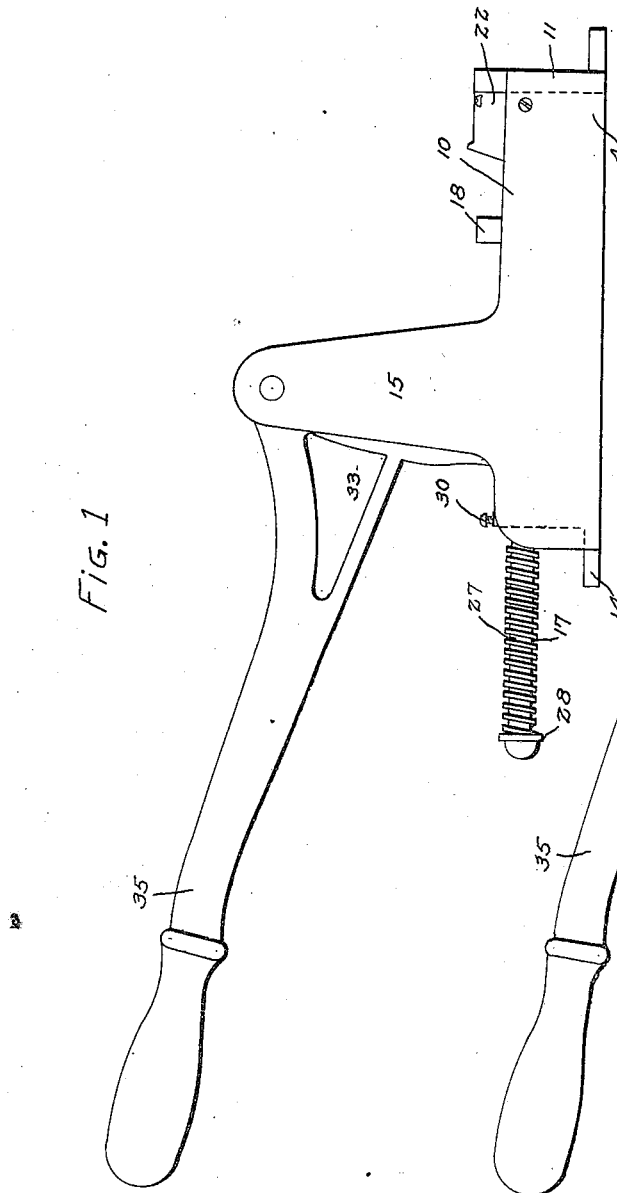
CHARLES WEBKE
INVENTOR C. WEBKE.
CANDY PRESSING MACHINE.
APPLICATION FILED OCT. 12, 1920.
1,392,863.
Patented Oct. 4, 1921.
2 SHEETS—SHEET 2.
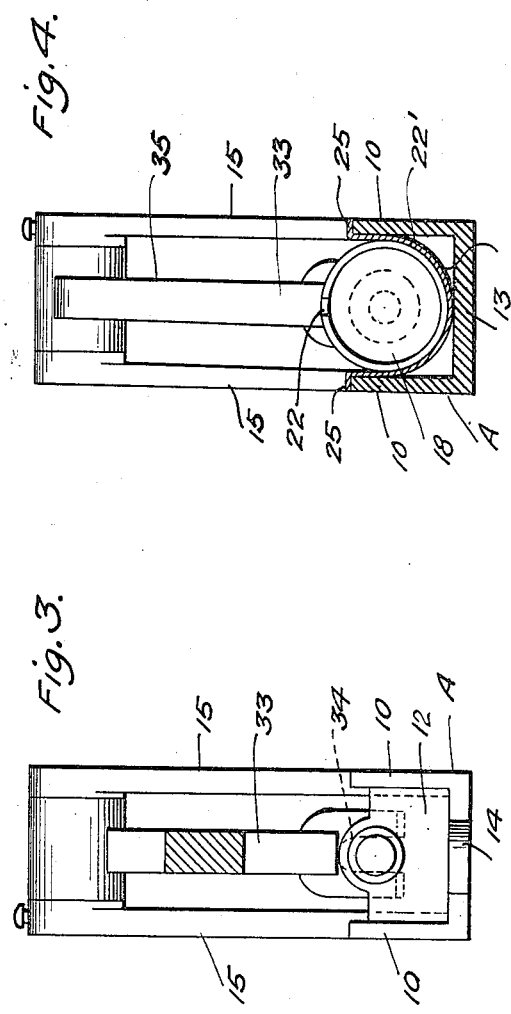
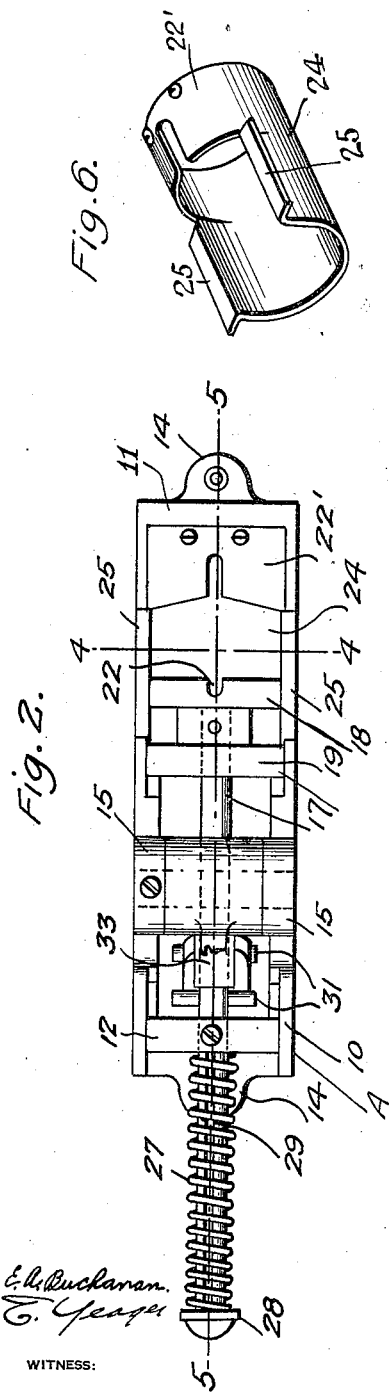
Charles Webke
INVENTOR
BY Victor J. Evans
ATTORNEY
WITNESS:
E. A. Buchanan
E. Yeager

UNITED STATES PATENT OFFICE.

CHARLES WEBKE, OF NEW YORK, N. Y.

CANDY-PRESSING MACHINE.

1,392,863.  Specification of Letters Patent.  Patented Oct. 4, 1921.

Application filed October 12, 1920. Serial No. 416,352.

*To all whom it may concern:*

Be it known that I, CHARLES WEBKE, a citizen of the United States, residing at New York city, in the county of New York and State of New York, have invented new and useful Improvements in Candy-Pressing Machines, of which the following is a specification.

This invention comprehends the provision of a candy pressing machine, primarily designed for pressing candy on a stick in the production of what is commonly known as candy suckers, although other candy may be pressed in the machine in such a way as to leave a perfectly smooth edge, while irregular pieces of candy can be arranged in the press and given any designed shape or configuration.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the machine constructed in accordance with my invention.

Fig. 2 is a top plan view with the handle broken away.

Fig. 3 is an end elevation.

Fig. 4 is a transverse sectional view taken on the line 4—4 of Fig. 2.

Fig. 5 is a longitudinal sectional view taken on line 5—5 of Fig. 2.

Fig. 6 is a perspective view of the female member of the mold.

The machine forming the subject matter of my invention comprises a frame indicated generally at A, and which comprises spaced parallel members 10 connected by end walls 11 and 12 respectively, and also by a bottom 13 which is approximately half the length of the machine. Projecting from the end walls are apertured lugs 14 adapted to receive suitable fastening elements for securing the machine to a fixed support. Rising from the opposed side walls 10 adjacent the rear end of the machine are spaced parallel standards 15 between which are journaled a bell crank lever as shown. The end wall 12 is provided with an opening 16 through which a reciprocating rod 17 slidably projects, the forward end of which carries a male member 18 of the mold for pressing the candy. This rod 17 is also slidable through a transversely disposed guide 19 which connects the side walls 10 of the frame. The male member 18 of the mold is substantially cup-shaped having a sleeve like portion 20 receiving the forward end of the rod 17 and detachably secured thereto by means of a set screw or the like 21. The annular flange of the member is notched as at 22 for a purpose to be hereinafter set forth. Manifestly, this member of the bowl operates within the female member as clearly shown in Fig. 6.

As shown, this member is in the form of a cylindrical receptacle 22' which is fitted between the side members of the frame with the bottom 23 of the receptacle arranged against the end walls 11 of the frame. Any suitable fastening means may be employed for holding this member of the mold fixed relatively to the frame in which it is arranged. The lower half of the annular wall of this member is extended to provide a substantially semi-cylindrical portion 24 which has its opposed longitudinal edges bent over the upper edges of the opposed side walls 10 of the frame as at 25. This portion 24 of the mold, terminates immediately in advance of the guide 19 for the rod 17, and consequently the male member 18 is always maintained in the portion 24. The component part of the mold may be constructed from any suitable material and also may vary in size and configuration without departing from the spirit of the invention. The form of the invention herein shown, as above stated, is primarily designed for making candy suckers, or in other words, candy-on-the-stick, the candy being arranged within the female member 22' and consequently pressed by moving the male member within the latter. The annular wall of the female member is provided with an elongated slot disposed in horizontal alinement with the notch 22 of the male member, coöperating with the latter to allow of the insertion of the stick for the candy into the female member. Both the male and female members of the mold are removably positioned within the frame of the machine, so that molds of different designs can readily replace the ones shown, but in this way pieces of candy of irregular shape can be readily and quickly given any desired form or configuration.

The rod 17 projects an appreciable distance beyond the rear end wall 12 of the frame, and encircling this portion of the rod is a coil spring 27 which has one end bearing against the end wall 12 of the frame, and its opposite end engaging a collar 28 arranged upon the rod. The spring functions to normally maintain the male member 18 of the mold in a retracted position, in which position the sleeve like member 20 bears against the guide 19 limiting the movement of the rod and male member to retracted positions. In order to maintain the notch 22 of the male member in horizontal alinement with the slot in the female member, the rod 17 must be prevented from turning, and for this purpose the rod is provided with a longitudinal groove 29 in which projects a set screw or the like 30 carried by the end wall 12 of the frame. Passed transversely through the rod 17 at spaced points, are pins 31 between which the terminal of the short branch 33 of the bell crank lever operates. The terminal of this branch is bifurcated as at 34 to straddle the rod 17 between the pins. The longer branch 35 of this lever projects rearwardly and is arranged substantially in the horizontal plane terminating an appreciable distance in advance of the front end wall 12 of the frame. Consequently, when this branch is depressed, the rod 17 is adjusted against the tension of the said spring, moving the male member 18 within the female member for the purpose above mentioned. When the lever is released the spring functions to return the parts to normal position.

While I have shown and described what I consider the preferred embodiment of the invention, I desire to have it understood that I do not limit myself to the details herein shown and described, and that such changes may be resorted to when desired as fall within the scope of what is claimed.

What is claimed is:—

1. A candy pressing machine comprising a frame, a mold including a female member arranged within the frame and secured thereto, a male member movable rectilinearly within the frame, said female member having a slot, said male member having a notch disposed in horizontal alinement with the slot, means for moving the male member in direction of the female member, and means for returning the male member to normal position upon release of the first mentioned means.

2. A candy pressing machine comprising a stationary frame, a mold including a female member arranged within the frame and secured thereto, said member having a longitudinal slot, a reciprocatory rod arranged within the frame, a male member carried by the rod and movable with respect to the female member, a coil spring encircling said rod and normally holding the latter and said male member in a retracted position, the male member of the mold having a notch arranged in aline with said slot, and means for moving the male member in the direction of the female member against the tension of said spring.

3. A candy pressing machine comprising a stationary frame, a mold including a female member arranged within the frame and secured thereto, a rod arranged to reciprocate within the frame, a male member carried by the rod and movable relatively to the female member, the respective members of said mold having an alined notch and slot, a bell crank lever pivoted upon the frame and associated with said rod for moving the latter and male member in the direction of the female member, and a spring associated with said rod for automatically returning the latter and said male member to a retracted position upon the release of said lever.

4. A candy pressing machine comprising a stationary frame, said frame including spaced side walls and end walls, a mold including a female member arranged between the side walls and secured to the frame, a rod arranged to reciprocate between the side walls, a male member carried by said rod, the respective members of said mold having an alined notch and slot, a spring encircling said rod and operating to normally maintain the latter and said male member in a retracted position, spaced parallel standards rising from the side walls of the frame, a bell crank lever pivoted between said standards and having one branch associated with the rod and the other branch projecting in advance of the foremost end wall, whereby said rod and male member may be moved in the direction of the female member against the tension of said spring.

5. A candy pressing machine comprising a stationary frame, said frame including opposed side walls, end walls, and a bottom terminating short of one end wall, a transverse guide connecting the side walls, a female member arranged between the guide and one end wall and reposing upon the bottom of the frame, a male member arranged to slide in the female member, a rod connected with the male member and slidable through said guide, yieldable means interposed between the opposite end wall of the frame and the free end of the rod for normally holding the male member against said guide, the latter constituting a stop for the male member under the influence of said yieldable means, and means for moving the male member against the tension of the yieldable means for the purpose specified.

6. A candy pressing machine comprising a frame, said frame including opposed side walls, a bottom, and end walls, a female member arranged upon the bottom and including a substantially cylindrical portion and a substantially semi-cylindrical portion, the latter terminating to provide flanges reposing upon the side walls, a male member arranged to reciprocate within the female member, spaced standards rising from the side walls of the frame, a bell crank lever pivoted between said standards, an operating rod projecting from the male member and associated with one branch of the bell crank lever, whereby said male member is reciprocated, yieldable means for normally holding the male member in a retracted position, the latter mentioned member having a notch and the cylindrical portion of said female member having a slot disposed in aline with said notch for the purpose specified.

In testimony whereof I affix my signature.

CHARLES WEBKE.